United States Patent [19]

Ichihashi et al.

[11] Patent Number: 4,763,872
[45] Date of Patent: Aug. 16, 1988

[54] OPERATING OIL INTRODUCTION TYPE ELECTROMAGNETIC VALVE

[75] Inventors: Koji Ichihashi; Toshihiro Murayama, both of Higashimatsuyama, Japan

[73] Assignee: Diesel Kiki Co., Ltd., Tokyo, Japan

[21] Appl. No.: 71,258

[22] Filed: Jul. 8, 1987

[30] Foreign Application Priority Data

Jul. 11, 1986 [JP] Japan ............................. 61-105537
Jul. 23, 1986 [JP] Japan ............................. 61-112097

[51] Int. Cl.$^4$ .......................... F16K 31/40; H01F 7/06
[52] U.S. Cl. ..................................... 251/30.01; 251/57
[58] Field of Search ............................... 251/30.01, 57

[56] References Cited

U.S. PATENT DOCUMENTS 4,463,773  8/1984  Kojima et al. .................... 251/57 X

FOREIGN PATENT DOCUMENTS 60-52510  4/1985  Japan .

Primary Examiner—Arnold Rosenthal
Attorney, Agent, or Firm—Wenderoth, Lind & Ponack

[57] ABSTRACT

An operating oil introduction type electromagnetic valve comprising a cap defining an electromagnetic valve external portion, an exciting coil, an inner housing and a stopper spacedly disposed inside the coil, a tubular slide guide with a bottom surface which is made of a non-magnetic material and disposed inside the inner housing and stopper, a plunger chamber formed within the guide and communicating at one end with an oil source and with the other end closed, and a plunger slidably contained within the plunger chamber and actuated by electromagnetic force of the coil.

13 Claims, 3 Drawing Sheets

OPERATING OIL INTRODUCTION TYPE ELECTROMAGNETIC VALVE

BACKGROUND OF THE INVENTION

1. Field of the Invention

This invention relates to an operating oil introduction type electromagnetic valve which is prevented from a poor operation due to impure operation oil.

2. Description of the Prior Art

In general, an electromagnetic valve includes a coil which is induced an electromagnetic force by a magnetic current, and a plunger which is attracted and moved by the electromagnetic force of the coil, the plunger being slidably contained inside the coil. In recent times, an operating oil introduction type electromagnetic valve appeared in which an operating oil is introduced to the sliding portion of the plunger in order to cool and lubricate the sliding portion, thereby to be able to achieve a high-speed and high-frequency of operation.

In the case such an electromagnetic valve is located, for example, within an oil tank of a hydraulic oil control circuit of a transmission assembly for an automotive vehicle and is used in the state that the electromagnetic valve is dipped in the operating oil, dust and foreign matter which are mixed in the operating oil somewhere in the circulation path of the operating oil are carried in the oil tank together with the operating oil and then introduced to the sliding portion. This often results in poor operation of the plunger. It is therefore necessary to protect the electromagnetic valve from the impure operating oil.

Japanese utility model early laid-open publication No. 60-52510 discloses one such example. Namely, the publication discloses a pressure control device in which a plunger is directly slidably contained inside a cap for containing operating oil.

However, such a conventional device as described above has still the shortcoming in that dust and foreign matter which are mixed in the operating oil flowing into the cap are accumulated in the sliding portion of the plunger to invite a poor operation.

SUMMARY OF THE INVENTION

It is an object of the present invention to provide an operating oil introduction type electromagnetic valve which can solve the problems involved in the conventional device, and which can be protected from the impure operating oil in order to obtain a favorable operation.

Another object of the present invention is to provide an operating oil introduction type electromagnetic valve which is provided with an oil reservoir chamber communicating with a plunger chamber with a closed end.

A further object of the present invention is to provide an operating oil introduction type electromagnetic valve which is provided outside or inside thereof with an oil reservoir chamber communicating with an oil source.

A still further object of the present invention is to provide an operating oil introduction type electromagnetic valve, wherein clean operating oil is reserved in the oil reservoir chamber and is then supplied to the plunger chamber.

A yet further object of the present invention is to provide an operating oil introduction type electromagnetic valve which is provided with an oil damper chamber adapted to control the operation of the plunger.

In order to achieve the above objects, there is essentially provided with an operating oil introduction type electromagnetic valve comprising a cap defining an electromagnetic valve external portion, an exciting coil, an inner housing and a stopper spacedly disposed inside the coil, a tubular slide guide with a bottom surface which is made of a non-magnetic material and disposed inside the inner housing and stopper, a plunger chamber formed within the guide and communicating at one end with an oil source and with the other end closed, and a plunger slidably contained within the plunger chamber and actuated by electromagnetic force of the coil.

The above-described objects, features and advantages of the present invention will become more apparent from the following detailed description with reference to the accompanying drawings.

DETAILED DESCRIPTION OF THE PREFERRED EMBODIMENT

One embodiment of the present invention will be described with reference to the accompanying drawings.

Figure 1:
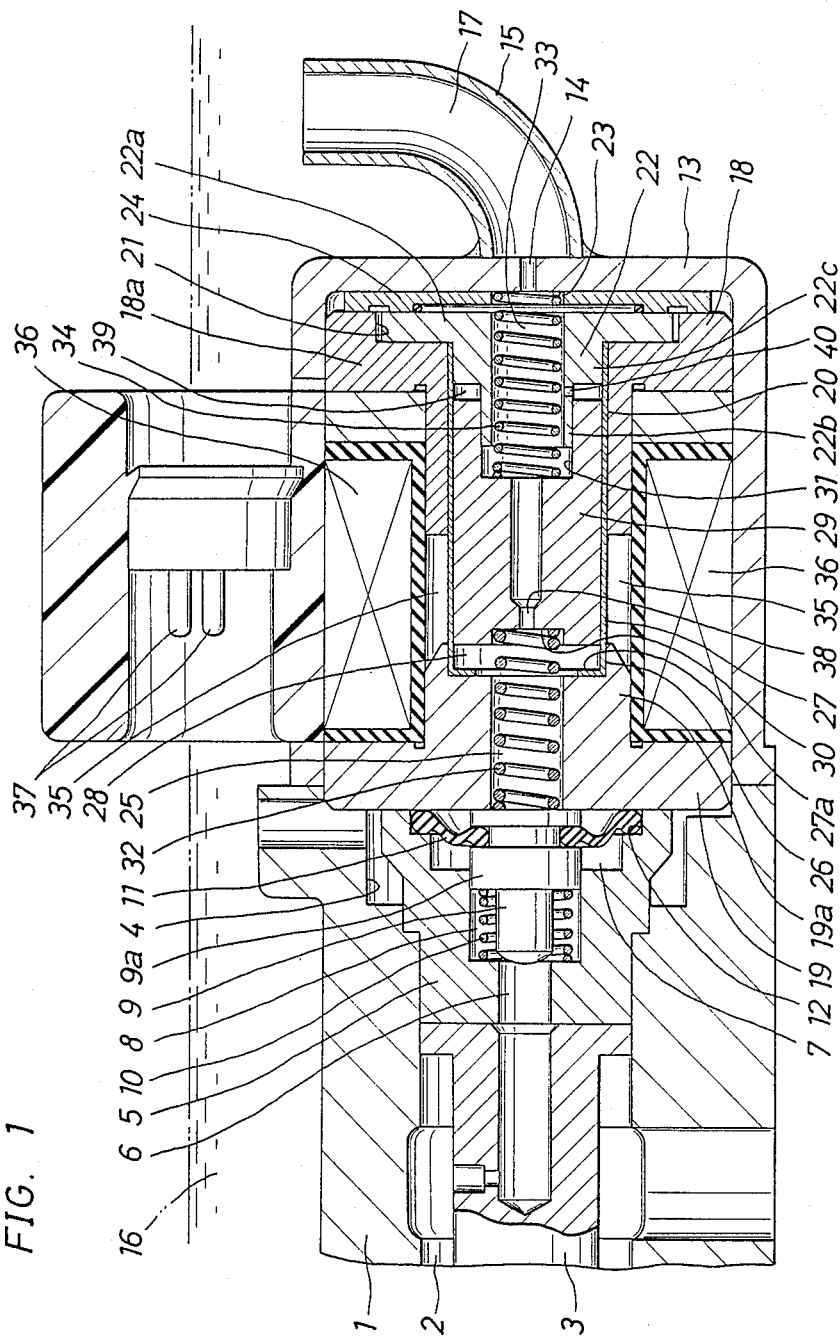
FIG. 1 is a sectional view of one embodiment of the present invention.

In FIG. 1, reference numeral 1 denotes a valve housing mounted on an upper portion within an oil tank (not shown). The valve housing 1 is formed therein with a valve bore 2, within which a spool 3 is slidably contained. The valve housing 1 is provided with a stepped depressed hole 4 which is opened up at one end thereof and communicating with the valve bore 2. Within the depressed hole 4, a valve seat 5 is rested.

The valve seat 5 is placed between an end face of the spool 3 and a stopper which will be described hereinafter. The valve seat 5 is provided with a pilot pressure chamber 6 and a diaphragm chamber 7 opened up at its shaft end portion. Between them, a valve chest 8 is formed and communicated with the chambers 6 and 7. A poppet valve 9 is slidably contained within the diaphragm chamber 7 and valve chest 8 in the axial direction. The poppet valve 9 is normally energized in the direction of a stopper which will be described hereinafter by a spring 10 interposed between the bottom portion of the valve chest 8 and a large diameter portion 9a of the poppet valve 9.

The poppet valve 9 is provided with a diaphragm 11. The peripheral end portion of the diaphragm 11 is accommodated within an annular groove 12 which is formed in the marginal portion of the opening of the diaphragm 7 to cut off the communication between the pilot pressure chamber 6 and a plunger chamber which will be described hereinafter, both the pilot pressure chamber 6 and plunger chamber being positioned at both sides thereof.

On the other hand, the valve housing 1 is provided with a sleeve-shaped cap 13 having a bottom secured to one end portion thereof. The cap 13 is formed in the center of the bottom portion with a small hole 14. One end of a communicating tube 15 formed of a curved tube is secured to and raised upwards from the marginal portion of the hole 14. The front end of the communicating tube 15 is opened up upwards, and the opening end is positioned below the surface of the operating oil 16 contained within the oil tank, and an oil reservoir chamber 17 formed therein is filled with the operating oil 16. The capacity of the oil reservoir chamber 17 is more than the capacity variation of the plunger chamber due to displacement of the plunger which will be described hereinafter. In other words, the capacity of the oil reservoir chamber 17 is more than the amount of operating oil which is pushed away by the plunger.

The cap 13 contains therein an inner housing 18 and a stopper 19 spaced apart from each other. The inner housing 18 comprises a hollow sleeve portion having a through hole 20 formed therein. A flange portion 18a of the inner housing 18 is formed in the end face thereof with a recess 21, in which a flange portion 22a of a plug portion 22 is rested. Between the end face of the flange portion 22a and the inner bottom surface of the cap 13, a seat 24 with a through hole 23 is interposed.

On the other hand, the stopper 19 comprises a hollow sleeve having an oil path 25 formed therein. One end portion of a shaft sleeve portion 19a thereof is formed with a depressed hole 26, in which is accommodated a bottom portion 27a of a slide guide 27 of a non-magnetic tube with a bottom.

More than a half portion of the outer periphery of the slide guide 27 is intimately contacted to and contained in a through hole 20 of the inner housing 18, the opening end thereof being abutted against the inner end face of the flange portion 22a and held between the inner periphery of the through hole 20 and the outer periphery of a boss portion 22c of the plug portion 22, a plunger chamber 28 being formed inside the slide guide 27.

A plunger 29 is slidably contained in the plunger chamber 28 along the inner periphery of the slide guide 27. The plunger 29 is formed in both end faces thereof with depressed holes 30 and 31 opened up there and communicating with each other. A spring 32 is interposed between one of the depressed holes 30 and the end face of the poppet valve 9. The poppet valve 9 is energized towards the pilot pressure chamber 6 by the spring 32.

On the other hand, within the other depressed hole 31, a shaft sleeve portion 22b projecting from the front end of the boss portion 22c is inserted. Within the shaft sleeve portion 22b, a communicating hole 33 having the same diameter as the through hole 23 is formed. A spring 34 is interposed between the bottom portion of the depressed hole 31 and the inner end face of the cap 13 through the hole 33. The plunger 29 is energized towards the stopper 19 by the spring 34.

In the figure, reference numeral 35 denotes a space as a non-magnetic portion which is formed between the inner housing 18 and the opposite end face of the stopper 19. This space may be filled with a non-magnetic material. 56 denotes an exciting coil. A lead wire of the exciting coil 56 is connected to a connector 37. 38 denotes an orifice opened up at one end of the plunger 29. The orifice 38 is communicated with the depressed holes 30 and 31. 39 denotes an annular oil damper chamber which is defined by the outer periphery of the shaft sleeve portion 22b, the inner periphery of the slide guide 27, and the opposite end faces of the boss portion 22c and plunger 29. The oil damper chamber 39 is located at one end of the plunger chamber 28 and varied its capacity according to the moving amount of the plunger 29 and communicated with the communicating hole 33 through an orifice 40 formed in the periphery of the basic end portion of the shaft sleeve portion 22b.

The operating oil introduction type electromagnetic valve with the above-described construction is mounted, for example, on an upper portion within the oil tank and more than half portion thereof is dipped in the operating oil 16 contained in the oil tank. The communicating tube 15 projecting outwards from the cap 13 is also hidden in the operating oil 16 and the oil reservoir chamber 17 therein is filled with the operating oil 16.

On the other hand, within the electromagnetic valve, the oil reservoir 17 is communicated with the small hole 14 and communicating hole 33. The hole 33 is communicated with the annular oil damper chamber 39 through the orifice 40. The chamber 39 is filled with the operating oil. The communicating hole 33 is communicated with the oil path 25 and the other end of the plunger chamber 28 through the depressed hole 31 and orifice 38. These are also filled with the operating oil.

The plunger 29 contained within the plunger chamber 28 stands still at a position where the springs 10, 32 and 34 are balanced, while the poppet valve 9 stands still at a position where the springs 10, 32 and 34 are balanced, the peripheral end portion of the diaphragm 11 mounted on the shaft portion thereof being pushed against the end face of the stopper 19 thereby to cut off the communication between the diaphragm chamber 7 and the oil path 25.

Under the above-described circumstance, when the exciting oil 36 is excited by the hydraulic oil circuit, a magnetic flux is generated in the coil 36 in proportion to the exciting current, and the plunger 29 is attracted and moved leftwards in FIG. 1 against the springs 10 and 32 by the magnetic circuit formed between the plunger 29 and the stopper 19.

In this case, the plunger 29 is moved along the inner periphery of the slide guide 27. Since the slide guide 27 is formed of a non-magnetic material, the plunger 29 will not be attached to the inner periphery of the guide 27. Moreover, since the guide 27 is intimately contacted with and contained within the inner housing 18 and disposed on the common axis with the housing 18, the plunger 29 itself which contacts the inner surface of the slide guide 27 is also adjusted the axis and moved on the coaxis with the guide 27. Thus, a smooth and stable operation can be obtained.

In this way, when the plunger 29 is moved, the capacity of the plunger chamber 28 at the moving side is decreased. As a result, the internal operating oil is pushed away towards the oil path 25 side. On the other hand, the capacity of the plunger chamber 28 opposite thereto, i.e., the capacity of the oil damper chamber 39 is increased. As a result, the increased amount of the operating oil is supplied from the communicating hole 33 through the orifice 40.

In this case, since the supplying oil to be supplied to the oil damper chamber 39 depends almost totally on the operating oil in the vicinity of and within the communicating hole 33, the supplying oil amount, i.e., exchanging oil amount, from the oil reservoir chamber 17, is restricted small and the operating oil in the communicating hole 33 and plunger chamber 28 maintains almost its initial oil quality. However, since the oil reservoir chamber 17 is separated from the surrounding operating oil 16 by the communicating oil 15, the entry of dust and foreign matter is restricted to that extent.

Furthermore, since no such frequent passing of the operating oil 16 in the oil tank is made in the vicinity of the small hole 14 within the oil reservoir chamber 17 as in the vicinity of the upper opening, a comparatively clean operating oil having little dust and foreign matter stays there. Since such clean operating oil is exchanged within the communicating hole 33 through the small hole 14 as described, the quality of the operating oil within the electromagnetic valve is not degraded by the exchanging oil from the oil reservoir chamber 17.

In this way, the spring 32 is contracted by the movement of the plunger 29 and the operating oil within the oil path 25 is compressed by the orifice 38. Since these act on the poppet valve 9, the valve 9 presses hard the spring 10 to block one end of the pilot pressure chamber 6 to open the valve. Accordingly, the pressure oil can be supplied to a hydraulic oil actuator (not shown) thereafter.

Next, when a current supply to the exciting coil 36 is, for example, reduced under control and when generation of the magnetic flux in the coil 36 is reduced, the plunger 29 is pushed back by the spring 32 to that extent and moved rightwards in FIG. 1. As a result, the capacity of the plunger chamber 28 located in the opposite side with respect to the moving direction of the plunger 29 is increased, while the oil damper chamber 39 at the side of the moving direction of the plunger 29 is contracted under pressure by the plunger 29.

In this case, the oil damper chamber 39 is defined into an annular shape by the outer periphery of the shaft sleeve portion 22b and the inner periphery of the slide guide 27, and also by the opposite end faces of the plunger 29 and boss portion 22c to form a generally sealed chamber state except that the orifice 40 is allowed to communicate with the communicating hole 33. As a result, the internal operating oil renders an oil damper effect which acts against the movement of the plunger 29. Accordingly, a rapid returning motion of the plunger 29 is restricted by the springs 10 and 32. On the other hand, since a small amount of operating oil is pushed into the communicating hole 33 from the orifice 40, the afore-mentioned oil damper effect is maintained for a long time.

In this case, a large portion of the operating oil pushed away by the plunger 29 is moved to the other plunger chamber 28 through the communicating hole 33 and the operating oil discharged from the small hole 14 is restricted small in amount. As a result, the operating oil within the electromagnetic valve is maintained in the almost initial oil quality.

In this way, the operating oil within the plunger chamber 28 is discharged by the displacement of the plunger 29 and a predetermined amount of operating oil moves in and out of the small hole 14 each time. However, in this case, since the inlet and outlet amount of the operating oil is restricted small as described, the quality of the operating oil within the electromagnetic valve is maintained generally the same, the dust and foreign matter mixed into the exchanging oil which is to be supplied from the oil reservoir chamber 17 are prevented from entering into the electromagnetic valve, and a poor operation of the plunger due to the entry of the dust and foreign matter can be prevented.

FIGS. 2 through 5 illustrate another embodiment of the present invention, wherein component elements corresponding the preceding embodiment are designated by the identical reference numerals. In this embodiment, the cap 13 is made somewhat long and is formed in an upper portion of the inner end face thereof with a small hole 14. Between the inner end face of the cap 13 and the end face of the flange portion 18a of the inner housing 18, a valve chest 41 is defined. The chest 41 contains therein a valve seal 42 made of an elastic material such as rubber.

Figure 2:
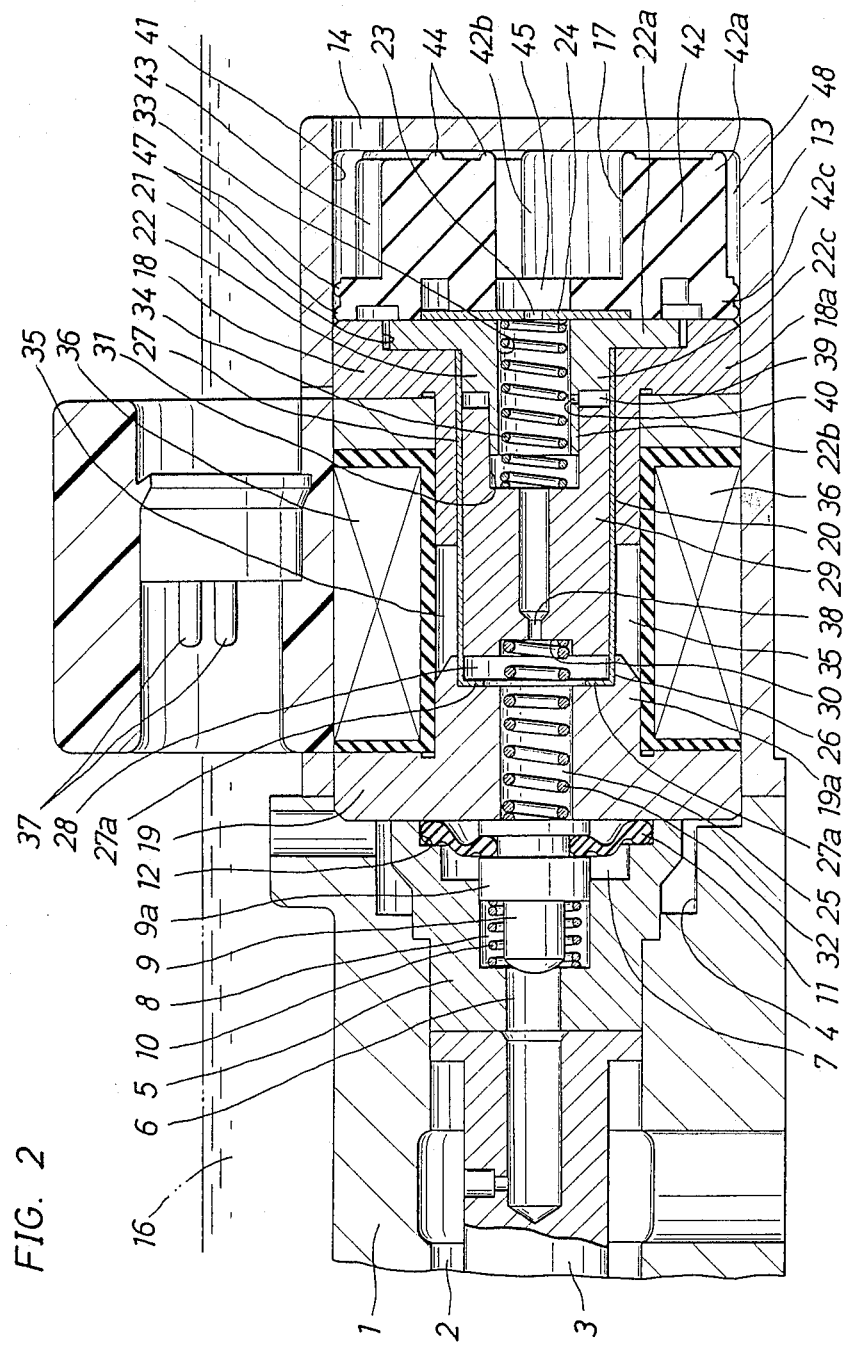
FIG. 2 is a sectional view of another embodiment of the present invention.

The valve seal 42 is formed in a generally cylindrical shape and the shaft sleeve portion 42a thereof is formed in the periphery with an oil groove 43 in the axial direction, so that when the valve seal 42 is mounted, it will be in alignment with a small hole 14 which is opened up in an upper portion of the bottom portion of the cap 13 as shown in FIG. 2 and is communicated with outside.

Figure 3:
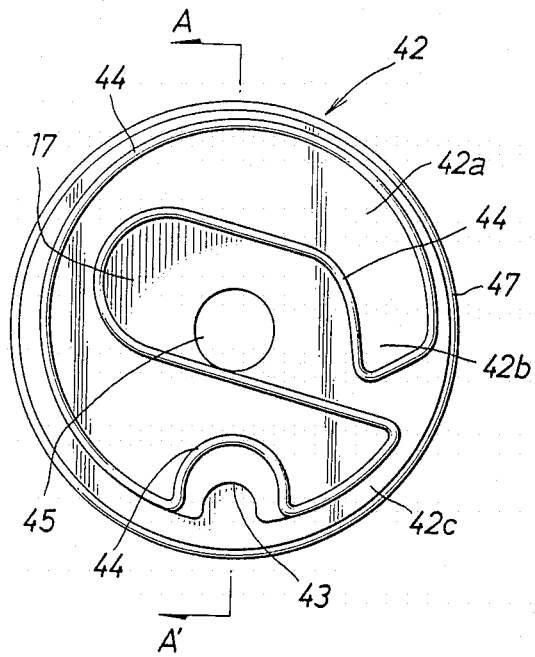
FIG. 3 is a plan view showing one example of a valve seal which is used in said another embodiment.
Figure 4:
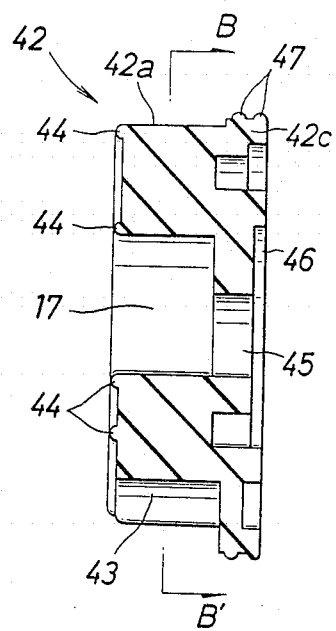
FIG. 4 is a sectional view taken along line A—A' of FIG. 3.
Figure 5:
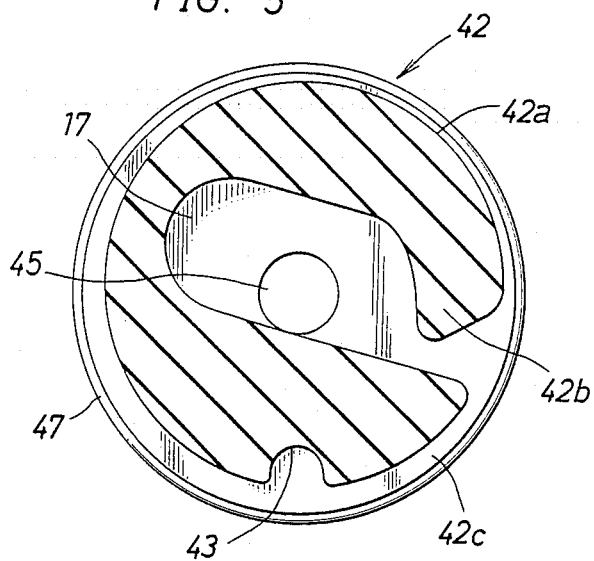
FIG. 5 is a sectional view taken along line B—B' of FIG. 4.

The center within shaft sleeve portion 42a is provided with a wide oil reservoir chamber 17 which is opened up in the side end face and the periphery of the shaft sleeve portion 42a. The opening portion in the periphery of the shaft sleeve portion 42a is provided with a lug portion 42b projecting therefrom as shown in FIG. 3. As a result, the opening portion is narrowed.

The capacity of the oil reservoir chamber 17 is set to be more than that of the plunger chamber formed by the displacement of the plunger so that the same amount of operating oil can be contained therein.

And, the marginal portion of the opening portions at the side of the side end faces of the oil groove 43 and the shaft sleeve portion 42a of the oil reservoir chamber 17 is formed with a series of continuous rib 44 as shown in FIG. 3. When the valve seal 42 is mounted, the rib 44 is intimately contacted with and mounted on the inner periphery of the bottom portion of the cap 13, so that the concentration of the operating oil around the end faces is maintained.

On the other hand, the end portion of the valve seal 42 is provided with a flange portion 42c having a larger diameter than that of the shaft sleeve portion 42a. The flange portion 42c is displaced slightly in the direction of the oil groove 43 with respect to the shaft sleeve portion 42a as shown in FIG. 3, and the center thereof is formed with a through hole 45 communicating with the oil reservoir chamber 17. The marginal portion of the opening portion of the through hole 45 is formed with a depressed hole 46. The periphery of the flange portion 42c is provided with annular ribs 47 and 47 projecting therefrom. When the valve seal 42 is mounted, the ribs 47 are intimately contacted with the inner surface of the cap 13 as shown in FIG. 2 so that the concentration of the operating oil around the inner periphery can be maintained.

Accordingly, when the electromagnetic valve with the valve seal 42 contained therein is mounted within the oil tank, the operating oil 16 is flowed iinto the cap 13 from the small hole 14 and is flowed in two directions from the oil groove 43 of the valve seal 42. These are flowed into the oil reservoir chamber 17 guided by the path 48 between the inner periphery of the cap 13 and the periphery of the shaft sleeve portion 42a of the valve seal 42.

At that time, the dust and foreign matter mixed into the operating oil are moved downwards of the path 48 by their own gravity. At the periphery of the shaft sleeve portion 42a, due to the throttling structure of the opening portion by the lug portion 42b the dust and foreign material are restricted from entering into the oil reservoir chamber 17 and are separated from the operating oil. As a result, a clean operating oil is contained in the oil reservoir chamber 17.

And, even if the operating oil flows into the cap 13 as described, the concentration of the operating oil can be maintained by the ribs 44 and 47 on the valve seal 42. Accordingly, no seal members are required to be provided to these places. Thus, the number of component parts can be reduced to that extent and the structure can be simplified.

In this way, the operating oil flowed into the oil reservoir chamber 17 moves from the through hole 45 into the communicating hole 33 via the through hole 23 of the seat 24. A portion of the operating oil is contained in the oil damper chamber 39 through the orifice 40, while the remaining portion of the operating oil is contained in the oil path 25 and in the other end of the plunger chamber 28.

In this case, since the oil reservoir chamber 17 is provided within the cap 13 and is separated from the operating oil in the oil tank as an oil source, even if an impurity deposited, for example, on the bottom portion of the oil tank is stirred by the operating oil which is returned into the tank and is floated within the tank, the impurity can be prevented from the entering.

Accordingly, this together with the cleaning effect by the path 48 as described makes it possible to supply a comparatively clean operating oil into the plunger chamber 28 and the oil damper chamber 39 through the communicating hole 33. As a result, the quality of the operating oil within the electromagnetic valve is not degraded due to said exchanging oil.

More specifically, in this embodiment, instead of providing the oil reservoir chamber 17 outside the electromagnetic valve, the chamber 17 is provided inside the electromagnetic valve, and the oil reservoir chamber 17 is formed into a valve seal 42 able to render a fluid tight function, thereby enabling to supply a clean operating oil into the plunger chamber 28 and to reduce the number of oil seal parts. All the other functions are generally the same as the preceding embodiment.

As described in the foregoing, since an operating oil introduction type electromagnetic valve according to the present invention comprises a cap defining an electromagnetic valve external portion and formed with a small hole communicating with an oil source, an exciting coil, an inner housing and a stopper spacedly disposed inside the coil, a tubular slide guide with a bottom surface disposed inside the inner housing and stopper, a plug portion engaged with a flange portion of the inner housing and formed with a shaft sleeve portion projecting inside the slide guide and a communicating hole communicating with the small hole, a plunger chamber defined by the inner periphery of the slide guide, the plunger chamber being blocked one end thereof and containing operating oil therein, and a plunger slidably contained within the plunger chamber and actuated by electromagnetic force of the coil, the plunger being of an inner oil passing structure in which a depressed hole is formed in the end face thereof so as to slidably engage with the shaft sleeve portion of the plug. Accordingly, the operating oil can be supplied into the plunger chamber by communicating the small hole to the oil source, and a favorable operating state of the electromagnetic valve can be obtained.

Furthermore, the present invention can offer an electromagnetic valve including an oil reservoir chamber outside or inside a cap, by providing a communicating tube communicating with an oil source outside the cap and projecting therefrom, the tube being provided therein with an oil reservoir chamber, or a valve chamber being defined within the cap by the inner periphery of the cap, an inner housing, and a plug, a generally cylindrical valve seal of an elastic material being contained within the chamber, an oil reservoir chamber being provided within the seal. Furthermore, by communicating these oil reservoir chambers to the small hole and the communicating hole, the operating oil of the oil source is introduced into the oil reservoir chambers and can then be supplied into the plunger chamber.

Furthermore, according to the present invention, the communicating tube is opened up facing upwards, the opening portion thereof is positioned below the oil surface of an oil source, or the oil reservoir chamber is opened in the periphery of the shaft sleeve portion of a valve seal and in the end face of the shaft sleeve portion thereof, the opening portion of the periphery of the shaft sleeve portion is provided with a lug portion projecting therefrom, the opening portion is made narrow, one end of the shaft sleeve portion is provided with a flange portion projecting therefrom in eccentric with the shaft sleeve portion, when the valve seal is mounted to the valve chest the opening portion in the end face of the shaft sleeve portion of the oil reservoir chamber is faced towards the inner end face of the cap, the end face of the flange portion is engaged with the inner housing and the end face of the plug, and the width of a path communicating with the small hole between the periphery of the shaft sleeve portion and the inner periphery of the cap is made narrower as it goes downwards. Accordingly, an impurity contained in the operating oil is prevented from entering into the oil reservoir chamber, a clean operating oil is contained in the oil reservoir chamber, and the clean operating oil is supplied into the plunger chamber, thereby to prevent the impurity from entering into the plunger chamber and to obtain a favorable operating state of the plunger.

Furthermore, according to the present invention, the basic portion of the shaft sleeve portion of the plug is provided with a sleeve-shaped boss portion, the boss portion is fitted in the opening end of a slide guide, an annular oil damper chamber is defined by the opposite end faces of the boss portion and plunger, the inner periphery of a slide guide, and the periphery of the shaft sleeve portion of the plug, the chamber is communicated with the through hole by an orifice formed in the periphery of the shaft sleeve portion, an oil damper effect is created by the operating oil contained in the chamber, the operating oil in the oil damper chamber is supplied and discharged into the communicating hole through the orifice, and, on the other hand, the capacity of the oil damper chamber is made variable according to the displacement of the plunger. Accordingly, the operation of the plunger can be controlled and a stable operation thereof can be obtained.

What is claimed is:

1. An operating oil introduction type electromagnetic valve according to the present invention comprises a cap defining an electromagnetic valve external portion and formed with a small hole communicating with an oil source, an exciting coil, an inner housing and a stopper spacedly disposed inside said coil, a tubular slide guide with a bottom surface disposed inside said inner housing and stopper, a plug engaged with a flange portion of said inner housing and formed with a shaft sleeve portion projecting inside said slide guide and a communicating hole communicating with said small hole, a plunger chamber defined by the inner periphery of said slide guide, said plunger chamber being blocked one end thereof and containing operating oil therein, and a plunger slidably contained within said plunger chamber and actuated by electromagnetic force of said coil, said plunger being of an inner oil passing structure in which a depressed hole is formed in the end face thereof in order to slidably engage with the shaft sleeve portion of said plug.

2. An operating oil introduction type electromagnetic valve as claimed in claim 1, wherein said electromagnetic valve is dipped and installed in the operating oil.

3. An operating oil introduction type electromagnetic valve as claimed in claim 1 wherein said cap is provided outside thereof with a communicating tube projecting therefrom and communicating with the oil source, and an oil reservoir chamber within said tube is communicated with said small hole and said communicating hole, so that operating oil in said oil reservoir chamber can be supplied into said plunger chamber.

4. An operating oil introduction type electromagnetic valve as claimed in claim 3 wherein said communicating tube is opened up facing upwards, and the opening portion is positioned below the oil surface of said oil source.

5. An operating oil introduction type electromagnetic valve as claimed in claim 1 wherein said cap is provided with a valve chamber defined therein by the inner periphery of said cap, said inner housing and said plug, said valve chamber contains therein a generally cylindrical valve seal made of an elastic material, and an oil reservoir chamber provided within said seal is communicated with said small hole and said communicating hole, so that operating oil within said oil reservoir chamber can be supplied into said plunger.

6. An operating oil introduction type electromagnetic valve as claimed in claim 3, wherein the capacity of said oil reservoir chamber is set to be more than the capacity variation of said said plunger due to displacement of said plunger.

7. An operating oil introduction type electromagnetic valve as claimed in claim 5, wherein said valve seal is provided with ribs for oil tight projecting from the periphery and the end face of the shaft sleeve portion of said valve seal, and these ribs are contacted under pressure with the inner periphery of said cap.

8. An operating oil introduction type electromagnetic valve as claimed in claim 5 wherein said oil reservoir chamber is opened up in the periphery of the shaft sleeve portion of said valve seal and also in the end face thereof, the opening portion of the periphery of said shaft sleeve portion is provided with a lug portion projecting therefrom, said opening portion is formed small, one end of said shaft sleeve portion is provided with a flange portion projecting therefrom in eccentric with said shaft sleeve portion, when said valve seal is mounted to said valve chest the opening portion at the end face of the shaft sleeve portion of said oil reservoir chamber is faced forwards the inner end face of said cap and the end face of said flange portion is engaged with said inner housing and the end face of said plug, the width of a path communicating with a small hole between the periphery of said shaft sleeve portion and the inner periphery of said cap is made narrower as it goes downwards.

9. An operating oil introduction type electromagnetic valve as claimed in claim 1 wherein a basic portion of the shaft sleeve portion of said plug is provided with a sleeve-shaped boss portion, said boss portion is fitted into the opening end of said slide guide, an annular oil damper chamber is defined by the opposite end faces of said boss portion and said plunger, the inner periphery of said slide guide, and the periphery of the shaft sleeve portion of said plug, said oil damper chamber is communicated with said communicating hole by an orifice formed in the periphery of said shaft sleeve portion, an oil damper effect is created by operating oil contained in said chamber, the operating oil within said oil damper chamber is supplied and discharged into said communicating hole through said orifice, and the capacity of said oil damper chamber is made variable according to displacement of said plunger.

10. An operating oil introduction type electromagnetic valve as claimed in claim 2, wherein said cap is provided outside thereof with a communicating tube projecting therefrom and communicating with the oil source, and an oil reservoir chamber within said tube is communicated with said small hole and said communicating hole, so that operating oil in said oil reservoir chamber can be supplied into said plunger chamber.

11. An operating oil introduction type electromagnetic valve as claimed in claim 2, wherein said cap is provided with a valve chamber defined therein by the inner periphery of said cap, said inner housing and said plug, said valve chamber contains therein a generally cylindrical valve seal made of an elastic material, and an oil reservoir chamber provided within said seal is communicated with said small hole and said communicating hole, so that operating oil within said oil reservoir chamber can be supplied into said plunger.

12. An operating oil introduction type electromagnetic valve as claimed in claim 5, wherein the capacity of said oil reservoir chamber is set to be more than the capacity variation of said said plunger due to displacement of said plunger.

13. An operating oil introduction type electromagnetic valve as claimed in claim 7, wherein said oil reservoir chamber is opened up in the periphery of the shaft sleeve portion of said valve seal and also in the end face thereof, the opening portion of the periphery of said shaft sleeve portion is provided with a lug portion projecting therefrom, said opening portion is formed small, one end of said shaft sleeve portion is provided with a flange portion projecting therefrom in eccentric with said shaft sleeve portion, when said valve seal is mounted to said valve chest the opening portion at the end face of the shaft sleeve portion of said oil reservoir chamber is faced forwards the inner end face of said cap and the end face of said flange portion is engaged with said inner housing and the end face of said plug, the width of a path communicating with a small hole between the periphery of said shaft sleeve portion and the inner periphery of said cap is made narrower as it goes downwards.

* * * * *